US008011288B2

(12) United States Patent
Gniesmer et al.

(10) Patent No.: US 8,011,288 B2
(45) Date of Patent: Sep. 6, 2011

(54) PISTON, ESPECIALLY COOLING CHANNEL PISTON, COMPRISING THREE FRICTION-WELDED ZONES

(75) Inventors: Volker Gniesmer, Alfeld (DE); Gerhard Luz, Nordheim (DE); Emmerich Ottlickzky, Furchtenberg (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 589 days.

(21) Appl. No.: 12/066,886

(22) PCT Filed: Sep. 17, 2005

(86) PCT No.: PCT/EP2005/010061
§ 371 (c)(1), (2), (4) Date: May 2, 2008

(87) PCT Pub. No.: WO2007/031107
PCT Pub. Date: Mar. 22, 2007

(65) Prior Publication Data
US 2008/0229923 A1 Sep. 25, 2008

(51) Int. Cl.
*F16J 1/09* (2006.01)
*F02F 3/08* (2006.01)

(52) U.S. Cl. .................... 92/231; 92/217

(58) Field of Classification Search .................... 92/208, 92/216, 217, 231
See application file for complete search history.

(56) References Cited

U.S. PATENT DOCUMENTS 3,877,351 A 4/1975 Barfiss et al.
3,915,141 A * 10/1975 Ottl et al. .................... 92/216
4,651,631 A 3/1987 Avezou et al.
5,934,174 A * 8/1999 Abraham et al. .................... 92/231
6,155,157 A 12/2000 Jarrett et al.
6,477,941 B1 * 11/2002 Zhu et al. .................... 92/231
6,513,477 B1 * 2/2003 Gaiser et al. .................... 92/187
6,840,155 B2 * 1/2005 Ribeiro et al. .................... 92/231
2001/0029840 A1 10/2001 Gaiser et al.
2003/0414088 7/2003 Grassi

FOREIGN PATENT DOCUMENTS

CH 230566 A 1/1944
DE 901104 1/1954
DE 2537182 3/1977
DE 3713191 C1 7/1988
DE 4134528 A1 5/1992
DE 10145589 4/2003
DE 102994038465 2/2006
DE 102004038465 3/2006
EP 0877160 11/1996
EP 1084793 3/2001
EP 1614885 A 1/2006

(Continued)

OTHER PUBLICATIONS

International Search Report dated Jun. 26, 2006.

(Continued)

*Primary Examiner* — Thomas E Lazo
(74) *Attorney, Agent, or Firm* — Young Basile

(57) ABSTRACT

A piston, especially a cooling channel piston of an internal combustion engine, has an upper part and a lower part which can be produced separately from each other and subsequently be assembled. The upper part has at least three radially peripheral joining webs and the lower part likewise at least three radially peripheral joining webs. During assembly, the webs are put together and connect the upper part firmly to the lower part.

6 Claims, 4 Drawing Sheets

FOREIGN PATENT DOCUMENTS

| | | | |
|---|---|---|---|
| EP | 1611975 | A | 4/2006 |
| FR | 2668090 | A1 | 4/1992 |
| GB | 1092720 | A | 11/1967 |
| JP | 52031213 | | 3/1977 |
| JP | 60166158 | | 8/1985 |
| JP | 2003025076 | | 1/2003 |
| SU | 1518562 | | 10/1989 |

OTHER PUBLICATIONS

Preliminary International Report on Patentability.

Co-pending related U.S. Appl. No. 12/066,890, filed Apr. 21, 2008, entitled "Piston, Especially Cooling Channel Piston, of an Internal Combustion Engine, Comprising Three Friction Welded Zones" assigned to the same assignee as the subject.

International Search Report dated Feb. 11, 2006 for PCT/EP2006/007638.

The English Translation of the International Preliminary Report on Patentability dated Aug. 2, 2006 for PCT/EP2006/007638.

International Search Report dated Apr. 5, 2008 for PCT/EP2005/010063.

English translation of Preliminary International Report on Patentability for PCT/EP2005/010063.

International Search Report dated Feb. 11, 2006 for PCT/EP/2006/007368.

The English Translation of the International Preliminary Report on Patentability dated Apr. 8, 2006 for PCT/EP2006/007638.

The English Translation of the Preliminary International Report on Patentability for PCT/EP2005/010063.

International Search Report Dated Dec. 15, 2006 for PCT/EP2006/010033.

Written Finding of the International Search Authority for PCT/EP2006/010033.

International Search Report dated Aug. 21, 2007 for PCT/EP2007/005456.

Written Opinion of the International Search Authority for PCT/EP2007/005456.

International Preliminary Report on Patentability for PCT/EP2005/010061.

International Search Report dated Jun. 25, 2006 for PCT/EP2005/010061.

The Written Opinion of the International Searching Authority for PCT/EP2006/007638.

International Search Report Dated Apr. 25, 2006 for PCT/EP2006/010063.

Written Finding of the International Search Authority for PCT/EP2005/010033.

* cited by examiner

PISTON, ESPECIALLY COOLING CHANNEL PISTON, COMPRISING THREE FRICTION-WELDED ZONES

BACKGROUND

The invention relates to a piston, especially a cooling channel piston, of an internal combustion engine.

A cooling channel piston of an internal combustion engine is known from U.S. Pat. No. 6,155,157 which consists of exactly two parts. These parts are an upper part which has a radially peripheral ring zone and a piston head combustion bowl. A lower part is provided as a second part which accommodates the piston skirt and the piston-pin bore. At the lower edge of the ring zone and at the lowest apex of the piston head combustion bowl there are two radially peripheral joining webs on the upper part which correspond in position and extension to two joining webs on the lower part. These two parts, which can be manufactured separately from each other, are solidly joined to each other by means of a joining process which is a friction-welding process. Afterwards, a single-piece cooling channel piston is provided which can be installed into the internal combustion engine, if necessary after it has been fine machined.

In this cooling channel piston known from U.S. Pat. No. 6,155,157 both the upper part and the lower part are shaped such that after the joining process, together with the mating joining points, they form a cooling channel lying behind the ring zone to circulate cooling medium. To this end, it is necessary to place the inward lying joining point very close to the outward lying joining point which is located in the vicinity of the ring zone so that the cooling channel in the piston head can be formed thereby. However, this has the disadvantage that support for the piston head can no longer be optimally ensured, in particular with respect to the injection and ignition pressures found in modern internal combustion engines.

Therefore, it is desirable to refine a generic piston, specifically a cooling channel piston, in such way that it has improved properties with respect to its strength and long-term stability.

SUMMARY

In accordance with the invention, a cooling channel piston of an internal combustion engine having an upper part and a lower part is disclosed which can be manufactured separately and then joined together, wherein the upper part in conjunction with the lower part forms at least one cooling channel located radially behind a ring zone and wherein further the upper part has at least three radially peripheral joining webs and the lower part similarly has at least three radially peripheral joining webs which are brought together during a joining process and by which the upper part is solidly connected to the lower part. Two joining webs each of the upper part and of the lower part are disposed coaxially inside four joining webs so that the upper part and the lower part are connected not just by way of two joining areas as was known previously but by way of three (or even more if need be) joining areas. The result is increased strength for the entire piston head so that the ignition and combustion pressures occurring there can be absorbed considerably better. Consequently, long-term stability is increased over the service life of the piston during operation in the internal combustion engine. As a result of the additional joining webs, support for the combustion bowl is improved, and specifically stiffened, so that the material thickness in the vicinity of the combustion bowl can be reduced, which results in weight savings.

Furthermore, the upper part and the lower part are shaped such that they form an additional cooling channel with the additional joining webs. Thus, the cooling channel piston has not only one cooling channel lying almost directly behind the ring zone but at least one additional cooling channel lying coaxially inside said cooling channel in which a cooling medium (specifically engine oil) can similarly circulate in order to be able to cool the piston head (and in particular the area below the combustion bowl. Depending on the shape of the upper part, of the lower part and their joining webs, three cooling channels can be created, for example, an outer and a center cooling channel and the third channel or area located below the apex of the combustion bowl.

In another aspect, the joining webs have approximately the same cross-section in three different joining areas. As a result, almost equal structural strength is achieved within the piston head. The almost equal cross-section has an advantageous effect on the joining process since the same quantities of energy have to be generated and they do not require costly adjustment to each other.

In one aspect, the joining process is a friction-welding process which allows simultaneous processing of all three joining areas, thus joining the upper part solidly to the lower part. The use of only two parts (upper part and lower part) to produce the cooling channel piston results in a reduction of parts multiplicity which is important, particularly in the mass production of pistons. In addition, it must also be considered that the upper part and the lower part can be produced using the same or different processes (for example, forging, casting, pressing, extrusion and similar) and of the same or different materials. For example, the upper part can consist of a more heat-resistant material than the lower part. Weight aspects also play a part here. For example, the upper part can consist of a lightweight material (such as aluminum) while the lower part consists of a ferrous material (for example, grey cast iron).

BRIEF DESCRIPTION OF THE DRAWING

Aspects of the piston, to which the piston is not restricted, however, are described in the following description and using FIGS. 1 to 4 in which.

DETAILED DESCRIPTION

Figure 1:
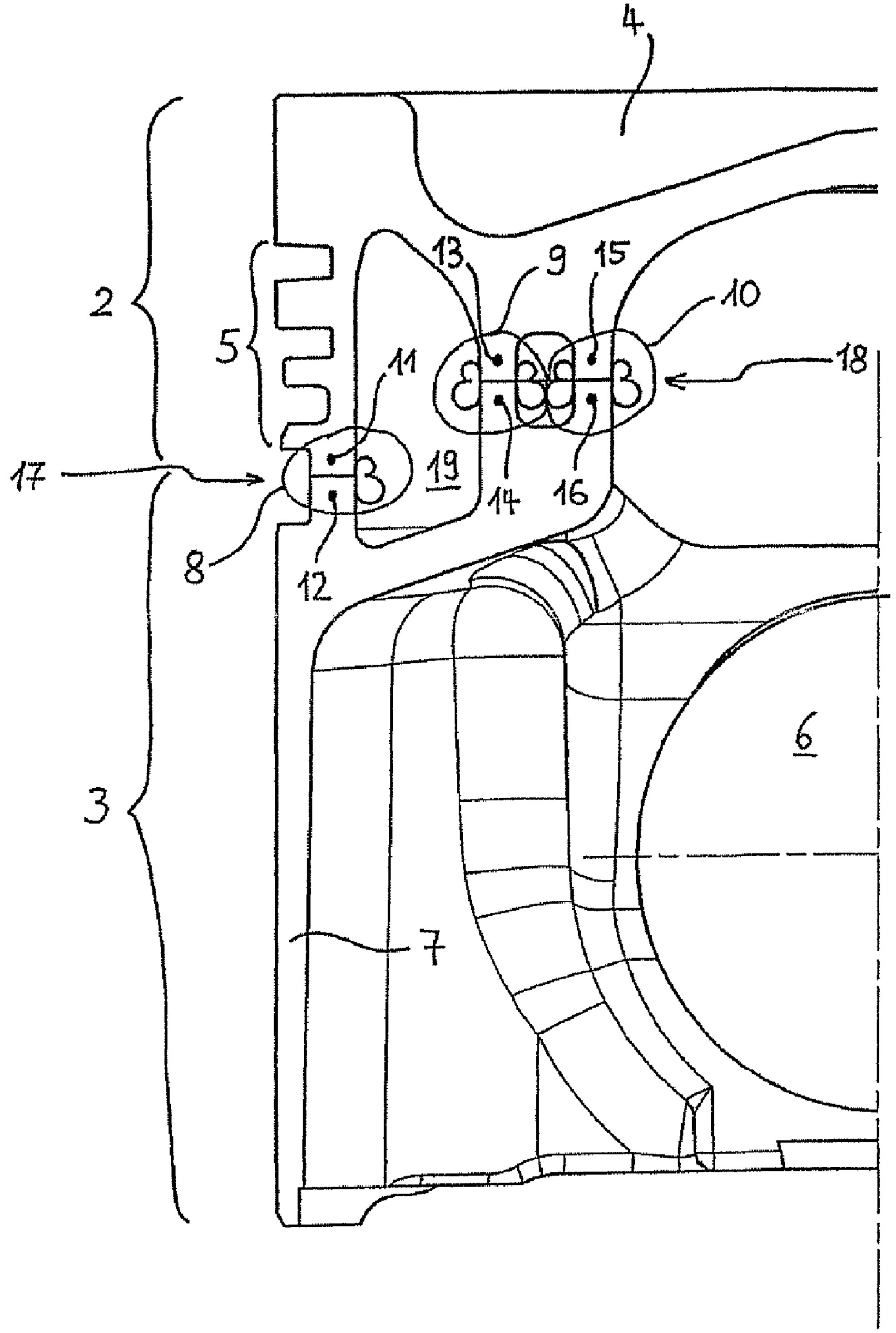
FIG. 1 is a cross section of a first aspect with three approximately identical friction-welding cross-sections.

FIG. 1 shows a cooling channel piston which has an upper part 2 and a lower part 3. In an intrinsically known way, the upper part 2 has a combustion bowl 4 and a radially peripheral ring zone 5 with ring grooves not identified more closely. The lower part 3 is joined below the upper part 2, the lower part having a piston-pin bore 6 and a piston skirt 7. The upper part 2 is joined to the lower part 3 specifically using a friction-welding process in three joining areas 8, 9 and 10. In the first joining area 8, a joining web 11 of the upper part 2 and a joining web 12 of the lower part 3 face each other. In the second joining area 9, a joining web 13 of the upper part 2 and a joining web 14 of the lower part 3 face each other. Finally, a joining web 15 of the upper part 2 and a joining web 16 of the lower part 3 are located in the third joining area 10. The first joining area 8 is disposed in a first joining plane 17, and the second joining areas 9, 10 are both disposed in a second joining plane 18. The upper part 2 and the lower part 3 are shaped to form a cooling channel 19 behind the ring zone 5 with radially peripheral joining webs 11, 12, 13 and 14. As a result of the two additional joining areas 9, 10, a hollow space is created therebetween which results in better distribution of forces and a weight reduction in the piston head. During the friction-welding process, peripheral weld beads are created which can be removed (particularly the friction-welding bead below the ring zone 5) or can also be left since the beads are either not a disruption or are no longer accessible (for example, the friction-welding beads which are created on the inside in the two joining areas 9, 10).

Figure 2:
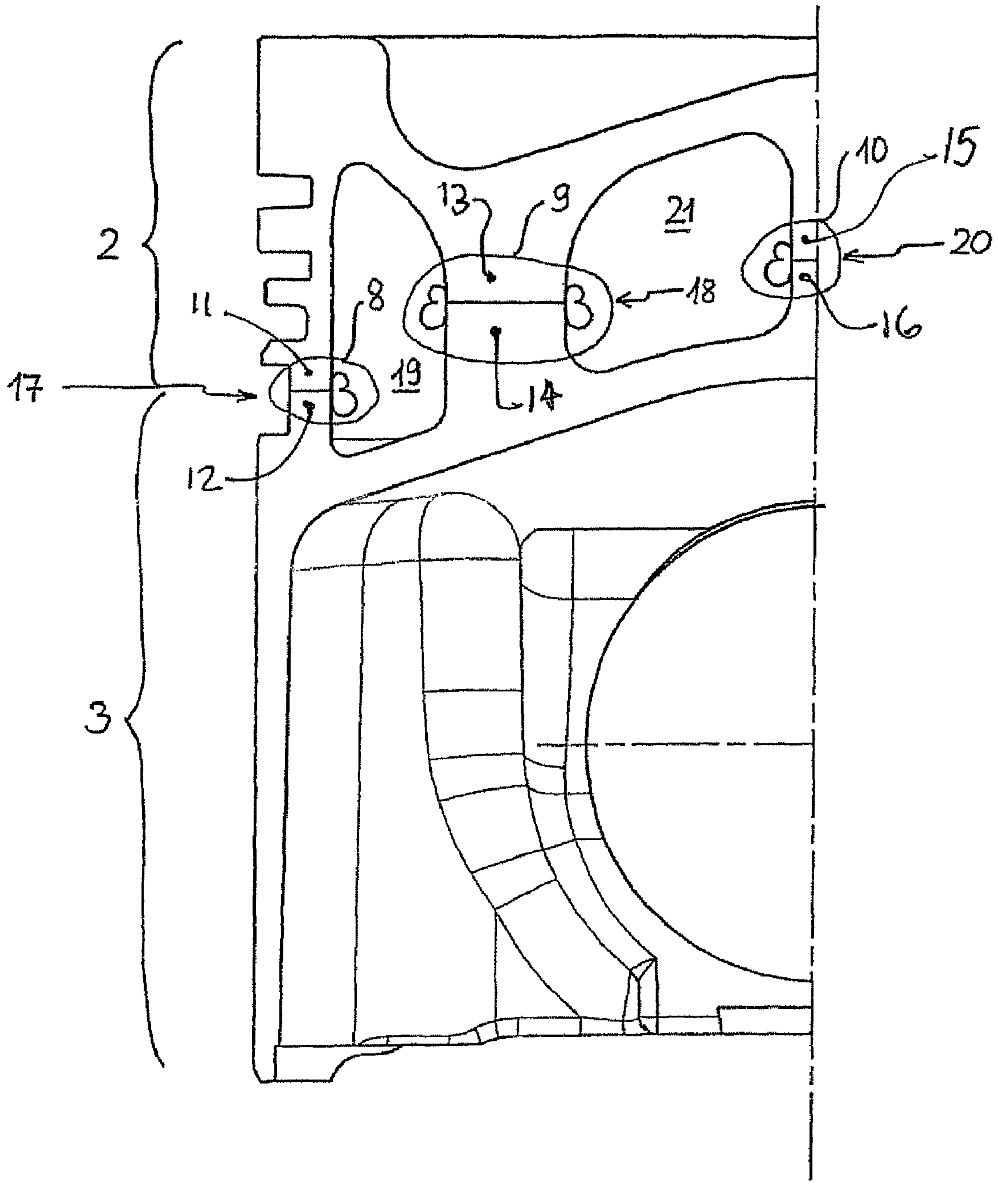
FIG. 2 is a cross section of a second aspect with different friction-welding cross-sections and different joining planes.

FIG. 2 shows the cooling channel piston 1 which also has three joining areas 8, 9 and 10 with appropriate joining webs 11 to 16. In this aspect, the first joining area 8 lies approximately below the ring zone 5 while the second joining area 9 is present at approximately the lowest apex of the combustion bowl 4. To support the highest apex of the combustion bowl 4, the third joining area 11 with its oppositely located joining webs 15, 16 is disposed on the axis of motion of the stroke of the cooling channel piston 1 during operation. In turn, this results in the cooling channel 19 already described in FIG. 1, while because of the shape of the upper part 2 and of the lower part 3 with the joining webs 13 to 16, an additional cooling channel 21 is created lying coaxially behind the cooling channel 19. The openings for the supply and return of the cooling medium circulating in the cooling channels 19, 21 are present but omitted here for the sake of greater clarity (as in the other Figures).

The joining webs 11 to 16 have a different cross-section and lie in different joining planes 17, 18, 20.

Figure 3:
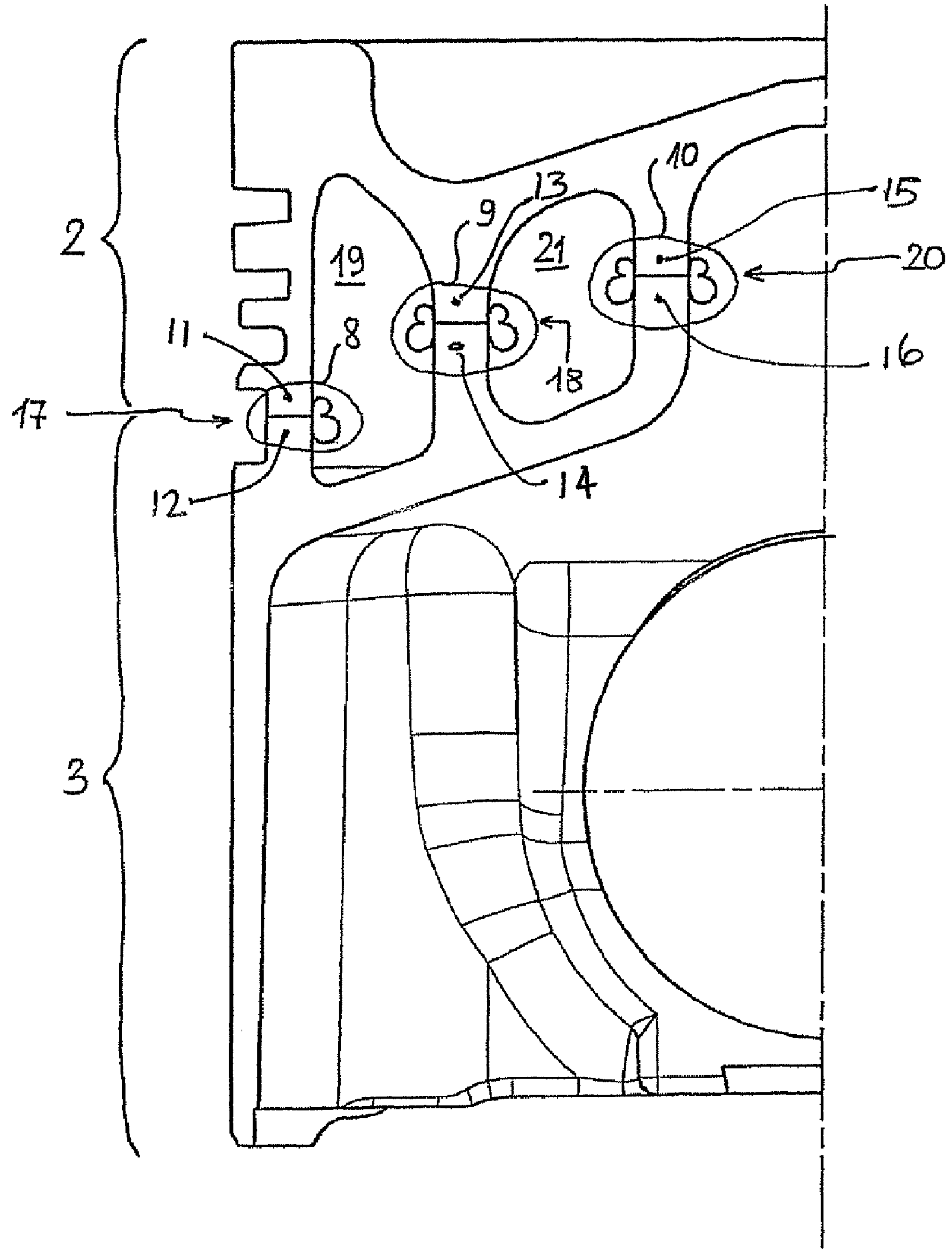
FIG. 3 is a cross section of a third aspect with almost identical friction-welding cross sections in different joining planes.

FIG. 3 shows the cooling channel piston 1 in which three joining areas 8 to 10 are present, where their joining webs 11 to 16 have almost the same cross-section but are disposed in three different joining planes 17, 18, 20. Two cooling channels are again present here.

Figure 4:
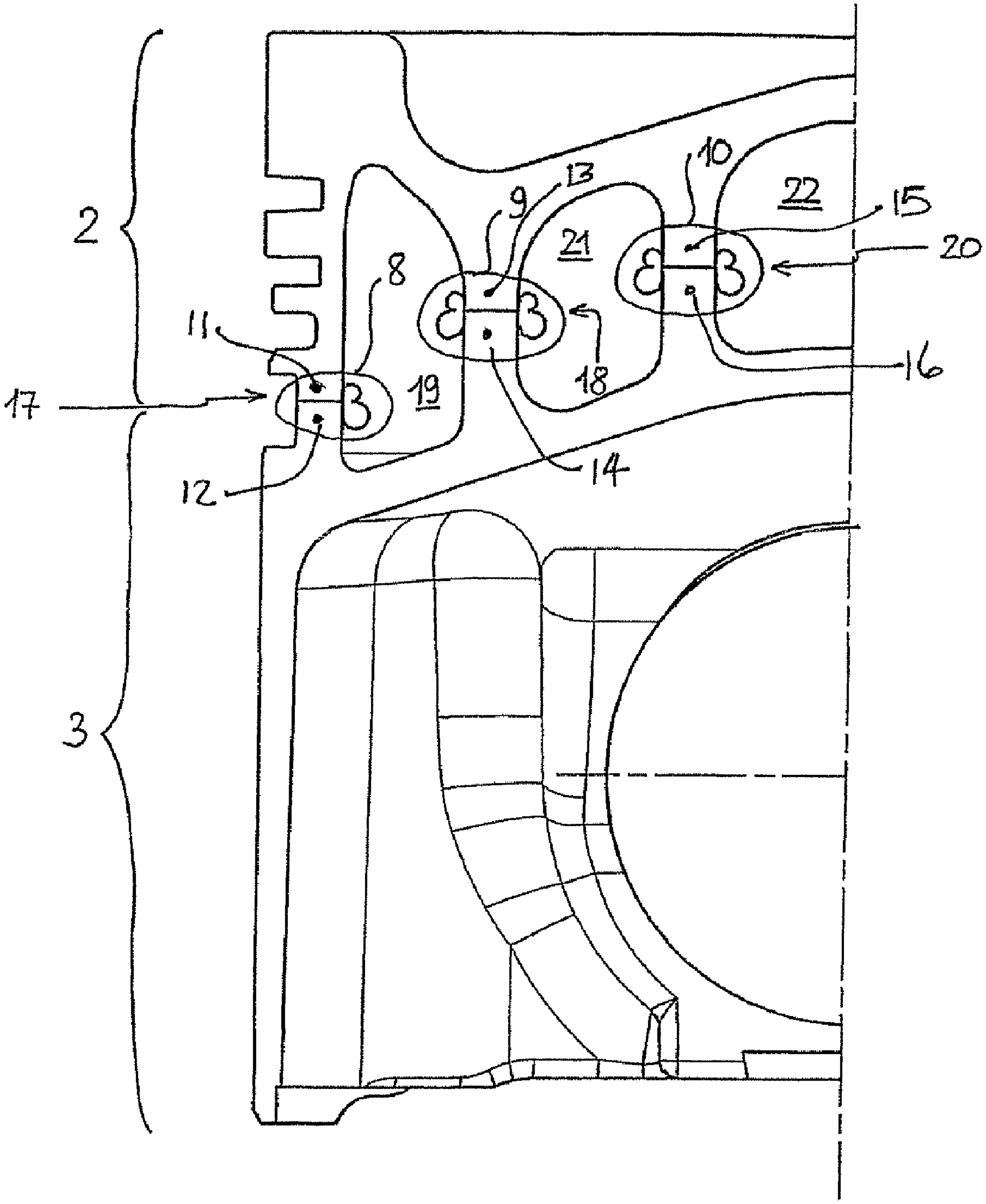
FIG. 4 is a cross section of a fourth aspect with almost identical friction-welding cross-sections and three different joining planes where three cooling zones are created.

FIG. 4 shows the cooling channel piston 1 with three joining areas 8 to 10 and the associated joining webs 11 to 16, where the joining webs have almost the same cross-section but are disposed (stepped) in three joining planes 17, 18, 20 which differ from one another. Because of the design of the lower part 3, not only are two cooling channels 19, 21 created but a further, closed space is realized in the inner area 22 (which extends below the upper apex of the combustion bowl 4) which can also function as a cooling zone.

Finally, it should be noted that the cooling channels can also be hollow spaces through which no cooling medium flows but which serve to save weight in the area of the upper part 2 (piston head). The features are equally applicable in the case of single-piece pistons (as shown in the drawing, where the finished, single-piece piston is joined together from the upper part 2 and the lower part 3) as well as finished, multi-piece pistons (in particular, articulated pistons).

What is claimed is:

1. A piston of an internal combustion engine with an upper part and a lower part which can be manufactured separately from each other and subsequently joined, where the upper part in conjunction with the lower part forms at least one cooling channel] disposed radially behind a ring zone and wherein further the upper part has at least three radially peripheral joining webs and the lower part similarly has at least three radially peripheral joining webs which are brought together during a joining process and by means of which the upper part is solidly connected to the lower part, and wherein contact surfaces of the at least three facing joining webs lie in three different planes.

2. The piston from claim 1, wherein the lower part and the upper part are shaped such that the lower part and the upper part form at least one additional cooling channel with additional joining webs.

3. The piston from claim 1, wherein the at least three joining webs in the upper part and the lower part have approximately the same cross section.

4. The piston from claim 1, wherein the joining process is a friction-welding process.

5. The piston from claim 1, wherein the upper part is formed of the same material as the lower part.

6. The piston from claim 1 wherein the upper part is formed of a different material than the lower part.

* * * * *